Figure 1:
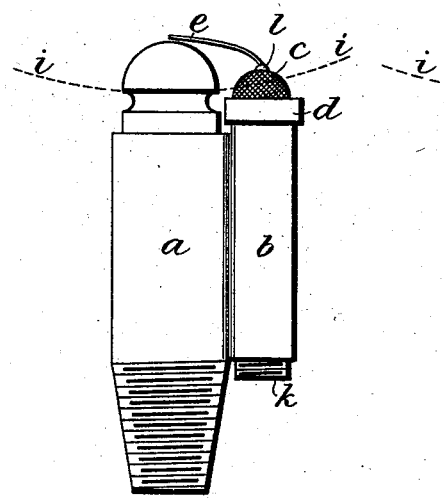

(No Model.)

J. F. DUKE.
MEANS FOR AUTOMATICALLY LIGHTING GAS.

No. 548,909. Patented Oct. 29, 1895.

WITNESSES:
Fred White
Thomas J. Wallace

INVENTOR:
John Frederick Duke,
By his Attorneys
Arthur E. Fraser & Co.

UNITED STATES PATENT OFFICE.

JOHN FREDERICK DUKE, OF LONDON, ENGLAND.

MEANS FOR AUTOMATICALLY LIGHTING GAS.

SPECIFICATION forming part of Letters Patent No. 548,909, dated October 29, 1895.

Application filed January 2, 1895. Serial No. 533,533. (No model.)

*To all whom it may concern:*

Be it known that I, JOHN FREDERICK DUKE, a subject of the Queen of Great Britain, residing at London, England, have invented certain new and useful Improvements in Means for Automatically Lighting Gas, of which the following is a specification.

This invention has for its object the igniting by its own action of ordinary coal-gas (alone or mixed with air) or of other gas having hydrogen for its base.

It is well known that platinum-black or spongy platinum will occlude a large quantity of oxygen from the air and that if a stream of hydrogen be directed upon the platinum the chemical combination of the two gases takes place with sufficient energy to raise the temperature of the platinum. Attempts have already been made to take advantage of this property of platinum by applying it to the automatic ignition of lighting coal-gas. In these attempts the gas issuing from an ordinary burner has been caused to blow upon the platinum contained in a receptacle, so as to warm this platinum sufficiently to render incandescent a fine wire of platinum carried from the platinum in the receptacle to a position where it comes into contact with the gas as it issues from the burner. This wire on becoming incandescent ignites the gas. None of these attempts has proved a practical success.

I have found by experiment that metallic platinum in the very finely-divided form known as "platinum-black" or "platinum-mohr" is the only form of platinum that will cause the combination of the coal-gas with its occluded oxygen at the ordinary temperature with sufficient energy to produce a red heat, or heat sufficient to render incandescent a length of platinum wire when a current of cold carbureted hydrogen or ordinary illuminating-gas plays upon it. I have also found that after a time the particles or atoms of the platinum-black coalesce, because the heat communicated to them by the flame and by their own act of occlusion, combined with the free access of the oxygen in the air, tends to decarbonize or fuse the platinum-black.

When the particles have more or less coalesced, they are not in a finely enough divided condition to bring about the combination of the coal-gas with the oxygen of the air at the ordinary temperature with sufficient rapidity to render the wire incandescent when a stream of cold carbureted hydrogen is passed over or along it.

Now, my invention mainly consists in mixing or using in conjunction with the platinum-black a material of such a nature and in such a proportion that when the carbureted hydrogen plays upon the mixture the said material will abstract free hydrogen from the gas and occlude it, and this hydrogen will at once combine with the oxygen occluded by the platinum-black and form water. This sudden combination raises the temperature of the mixture sufficiently to render the platinum active enough to bring about the combination of the coal-gas with the oxygen of the air at the ordinary temperature.

The material used with the platinum should be in such proportion that the extent to which the occlusion of hydrogen and consequent formation of water are carried should be such that the carbon, which is separated from the carbureted hydrogen in an amorphous form, shall be consumed by the heat of the gas-flame or by chemical reaction without leaving such a deposit of carbon as will diminish the activity of the mixture, but only just sufficient deposit to prevent the coalescing or fusing of the particles of platinum.

The material which I find will effect the purpose is palladium in either of the finely-divided forms known, respectively, as "palladium-black" and "spongy palladium."

In carrying out the invention I thoroughly mix together the platinum-black and the palladium-black or spongy palladium, preferably by any suitable mechanical means. The proportions I have found to answer well are nine parts, by weight, of platinum to one part, by weight, of palladium, and it is best to first form a mixture of the one part of palladium with one part of platinum and then to admix this mixture to the other eight parts of platinum. This mixture of platinum and palladium can be employed alone; but it is better to incorporate it with a suitable incombustible material, preferably finely-teased asbestos, in the proportion of about three parts, by weight, of asbestos to one part of the mixture. I place it in a small cage or receptacle formed, preferably, of platinum-wire gauze of very fine mesh—say about one hundred and twenty meshes to the square inch—the cage being so constructed that the air shall have free access to it, especially at the bottom of the cage, or that part opposite to where the gas-flame plays upon it. I have found that covering the mixture with a platinum-wire gauze of very fine mesh tends to aid the activity of the mixture by keeping it below the temperature required for consuming the amorphous carbon deposited within its pores. From the mixture in the cage I carry a fine platinum wire to a position just at the outside of the black line which is always naturally formed by the burning gas at the side of the slit or opening in the burner—that is to say, just where the gas and air mix. This cage is placed in such a position relatively to the gas-burner that the atmospheric air shall play on it or be drawn through it at the one side and the gas at the other. This can be satisfactorily carried out by mounting the cage on the top of a metal tube open at the bottom and fixed to the side of the burner. The current of gas blowing across the top of the cage tends to produce an upward current of air, the tube acting as a chimney. The atmospheric air is thus drawn through the platinum-palladium mixture in the cage and the combination of the carbureted hydrogen and oxygen of the air is thus favored. The heat generated by this combination is sufficient to raise the temperature of the mixture high enough to render the platinum wire incandescent, notwithstanding the stream of cold coal-gas passing along or over it, and this wire then ignites the gas at the burner. The current of air continually passing through the mixture from the tube has the effect of keeping the mixture comparatively cool.

The accompanying drawings show how I prefer to apply my invention to an ordinary gas-burner.

Figure 2:
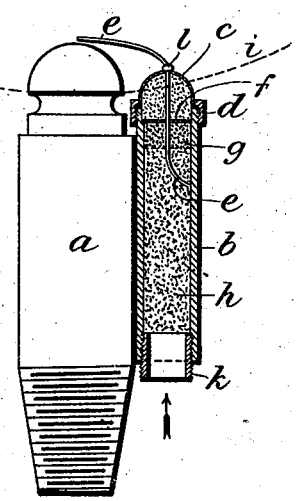
Figure 3:
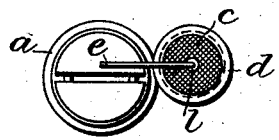

Figure 1 is an elevation of the burner with the tube and cage fixed thereto. Fig. 2 is a similar view, but with the tube and cage in section; and Fig. 3 is a plan.

$a$ is the burner.

$b$ is the tube fixed to one side of the burner and open at bottom with open screw-plug.

$c$ is the cover of the gauze cage at the top of the tube and containing the mixture of platinum and palladium with or without asbestos or other incombustible material. The cover $c$ is preferably made of platinum-wire gauze of very fine mesh for the purpose already explained.

$d$ is a screw-cap to secure the cage in position.

$e$ is the platinum wire carried from the mixture in the cage to a position near the outlet of the burner.

$l$ indicates a small quantity of fused platinum and palladium mixture which it is preferred to have on the wire $e$ near the gauze cover $c$.

$f$ is a partition of wire-gauze forming the bottom of the cage.

$g$ is a more or less compressed piece or plug of asbestos in the tube $b$, and $h$ is loose asbestos placed in the lower part of the tube.

$k$ is a hollow screw inserted in the bottom of the tube $b$ to hold up the asbestos. The asbestos $g$ and $h$ is, however, not essential, its object being chiefly to catch any particles of the mixture which may pass through the gauze $f$.

The dotted line $i$ indicates the current of gas that issues from the burner.

Although specially applicable to automatically igniting gas at ordinary gas-burners used for illuminating, it is also adapted for igniting atmospheric burners and for igniting the explosive mixture of gas and air in gas-motor engines in place of the master-light ordinarily employed.

What I claim, and desire to secure by Letters Patent, is—

1. The improved igniter consisting of a mixture of platinum black, together with palladium in a finely divided form, as palladium black or spongy palladium, substantially as set forth.

2. The improved igniter consisting of a mixture of platinum black and palladium in a finely divided form as palladium black or spongy palladium, incorporated with an incombustible material, substantially as set forth.

3. For automatically igniting gas, a holder containing platinum black and palladium in a finely divided state, said holder having a cover formed of platinum wire gauze of very fine mesh, substantially as set forth.

4. For automatically lighting gas, the combination with a gas burner of a cage containing platinum black and palladium in a finely divided state, a platinum wire leading from said platinum and palladium to near the outlet of said burner, and an open tube below said cage to supply a current of atmospheric air to the platinum and palladium substantially as and for the purpose set forth and shown.

In witness whereof I have hereunto signed my name in the presence of two subscribing witnesses.

JOHN FREDERICK DUKE.

Witnesses:
JOHN C. MEWBURN,
GEORGE C. BACON.